United States Patent [19]
Brown et al.

[11] Patent Number: 5,673,403
[45] Date of Patent: Sep. 30, 1997

[54] METHOD AND SYSTEM FOR DISPLAYING APPLICATIONS OF DIFFERENT OPERATING SYSTEMS ON A SINGLE SYSTEM USING THE USER INTERFACE OF THE DIFFERENT OPERATING SYSTEMS

[75] Inventors: Michael Wilfrid Brown; Lester Brooks Hickerson, both of Austin, Tex.; Colin Victor Powell, Highland Beach, Fla.; William Chapel Tims, Austin, Tex.; Robert Leonard Tycast, Boca Raton, Fla.; Richard Lee Verburg, Austin, Tex.

[73] Assignee: International Business Machines Corporation, Armonk, N.Y.

[21] Appl. No.: 975,753

[22] Filed: Nov. 13, 1992

[51] Int. Cl.$^6$ .................................................. G06F 3/14
[52] U.S. Cl. ............................... 395/335; 395/326
[58] Field of Search ...................... 345/156; 395/155, 395/157, 275, 500, 700

[56] References Cited

U.S. PATENT DOCUMENTS

| | | | |
|---|---|---|---|
| 4,493,034 | 1/1985 | Angelle et al. | 364/200 |
| 4,737,906 | 4/1988 | Edwards | 364/200 |
| 4,855,936 | 8/1989 | Casey et al. | 364/521 |
| 4,891,709 | 1/1990 | Adams | 358/256 |
| 4,920,481 | 4/1990 | Binkley et al. | 364/200 |
| 4,937,036 | 6/1990 | Beard et al. | 340/706 |
| 4,939,507 | 7/1990 | Beard et al. | 340/706 |
| 4,961,133 | 10/1990 | Talati et al. | 364/200 |
| 5,062,037 | 10/1991 | Shorter et al. | 364/200 |
| 5,226,117 | 7/1993 | Miklos | 395/157 |
| 5,252,951 | 10/1993 | Tannenbaum et al. | 345/156 |
| 5,361,336 | 11/1994 | Atchison | 395/275 |
| 5,377,317 | 12/1994 | Bates et al. | 395/157 |

FOREIGN PATENT DOCUMENTS 5831438 2/1983 Japan.

OTHER PUBLICATIONS

*Computer Design*, vol. 31, No. 8, Aug. 199, Littleton MA, "Tools Help Move Applications Between Different GUI's", Williams, pp. 50–53.

IBM TDB, "OS/2 Presentation Manager Clipboard Support for a Windows 5250 Emulator", vol. 35, No. 2, Jul. 1992, pp. 323–332.

IBM TDB, "Window Class Library with Command Table Dispatching", vol. 35, No. 6, Nov. 1992, pp. 357–360.

*Primary Examiner*—Thomas G. Black
*Assistant Examiner*—Ruay Lian Ho
*Attorney, Agent, or Firm*—Mark E. McBurney; David A. Mims, Jr.

[57] ABSTRACT

Two or more interconnected computer systems, each having a different operating system. For example, a client system may be running the OS/2 operating system and a second, server computer the AIX system. The server system that allocates display screen space for application windows running on the server system and supports window management. Further, the window management places GUI borders around the application window which allow a user to interact with the client application. The functions in these GUI borders include a menu bar, scroll bar, sizing features, pull down windows, and the like. The client application is mapped into a form which enables the application commands to be recognized by a library of functional calls associated with the server system. The server system, displays the client application in the designated window along with the server GUI. In this manner a user can interact with a client application using the server graphical user interface.

14 Claims, 6 Drawing Sheets

METHOD AND SYSTEM FOR DISPLAYING APPLICATIONS OF DIFFERENT OPERATING SYSTEMS ON A SINGLE SYSTEM USING THE USER INTERFACE OF THE DIFFERENT OPERATING SYSTEMS

BACKGROUND OF THE INVENTION

1. Field of the Invention

The present invention generally relates to the display of an application on the screen of a remote computer system. More particularly, a program application that runs on a first operating system is capable of being displayed on the screen of a computer system using a second different operating system such that the graphical user interface (GUI) of the second operating system is used to present the program application of the first operating system.

2. Description of Related Art

Currently it is known for an operating system window manager to allocate a portion of a display screen that can be used by an operating system. In particular, U.S. Pat. No. 4,937,036, 4,937,507 and 4,920,481 describe systems wherein a portion of the display screen is allocated for use by a processor which emulates another processor in this window. This window will include the user interface for the emulated operating system.

U.S. Pat. No. 4,961,133 discusses a system for providing portability of program applications across different hardware and operating system environments. The transportable code is compiled and linked to create code executable by another operating system. U.S. Pat. No. 4,855,936 is an application program interface that handles full screen input/output (I/O) display operations. The application program is required to determine display characteristics prior to performing full screen I/O operations and provide a buffer as output is to be performed. The application programming interface provides a means for allowing an application programmer to write an application without being concerned with the low level detail of full screen I/O operations. That is, the application is architecture independent with respect to the full screen I/O operations. Japanese patent JP 58-31438 is a system that converts messages into specific display format suitable for centralized monitoring and control. A protocol converting portion transforms a message into a specific format, as required. The central monitoring system established an interface for transmitting/receiving the protocol.

It can be seen that the related art merely allows for a host system to allocate a specific portion of its display to a client operating system, which is either emulated from the host processor, or remotely connected. However, each of the described references require a client operating system window. Further, if the client operating system supports windowed applications, such application windows are confined to the client OS window. None of the described references can display a client OS application window directly on the host OS window without the need for a client OS window. A need exists for a system wherein multiple application windows from multiple client operating systems can be run as peers with host application windows in a host operating system window. However, none of the described references show a first system, which uses its own window manager to display the first operating system GUI in a window, running a program application written for an entirely different operating system, concurrently in the same window with the first operating system GUI. Thus, it can be seen that a need exists for a system wherein multiple graphical user interfaces can be run concurrently in a single window.

SUMMARY OF THE INVENTION

Is desirable to have the ability to use the GUI that is most familiar to a user, even when running an application program that operates in conjunction with an unfamiliar operating system, or GUI. For example, an AIX user will appreciate being able to run an application written for OS/2 within a window in conjunction with the AIX graphical user interface. In this manner a distributed system is created wherein applications running on a first system are used remotely.

Broadly, the present invention includes at least two interconnected computer systems, each having a different operating system running thereon. For example, a first system may be running the OS/2 system and a second computer the AIX system. The X Window System (X) is a display environment, or graphical user interface that is available from MIT (X Window System is a trademark of the Massachusetts Institute of Technology) and runs on the operating systems, such as the UNIX system, AIX operating system, and other systems based on the UNIX OS. This GUI includes a server (X server) that allocates display screen space for applications running on the AIX system. Further, the window manager places GUI borders in the window which allow a user to interact with the application running therein. The functions in these GUI borders include a menu bar, title bar, scroll bar, sizing features, pull down windows, and the like. The present invention allows a non-AIX application (such as an OS/2 application), a non X Window application, or the like, to run within the window allocated by the AIX window manager and in conjunction with the AIX (X11) GUI border contained therein.

First, the non-AIX application calls are mapped into an X11 form which enables the application commands to be recognized by the X library of functional calls. The operating system, for which this application was written, e.g. OS/2, must be compatible with the X library (X lib). The operating system then sends the translated OS/2 application instructions to, for example, the AIX operating system through the TCP/IP communications protocol. The X11 server, working in conjunction with the X window manager displays the OS/2 application in the designated window along with the AIX GUI. In this manner the output of an OS/2 application will be displayed in conjunction with the AIX graphical user interface. Further, the process is reversed and input from the user, to the AIX GUI, are mapped into OS/2 application calls such that the OS/2 application can be manipulated by input to the AIX GUI.

Therefore, in accordance with the previous summary, object, features and advantages of the present invention will become apparent to one skilled in the art from the subsequent description and the appended claims taken in conjunction with the accompanying drawings.

BRIEF DESCRIPTION OF THE DRAWINGS

FIGS. 5 A–C are flowcharts illustrating the mapping function of the present invention which allows a program application to be interactively running in a window of a display on a computer system with a different operating system wherein multiple GUI's are present.

DETAILED DESCRIPTION OF THE PREFERRED EMBODIMENTS

Figure 1:
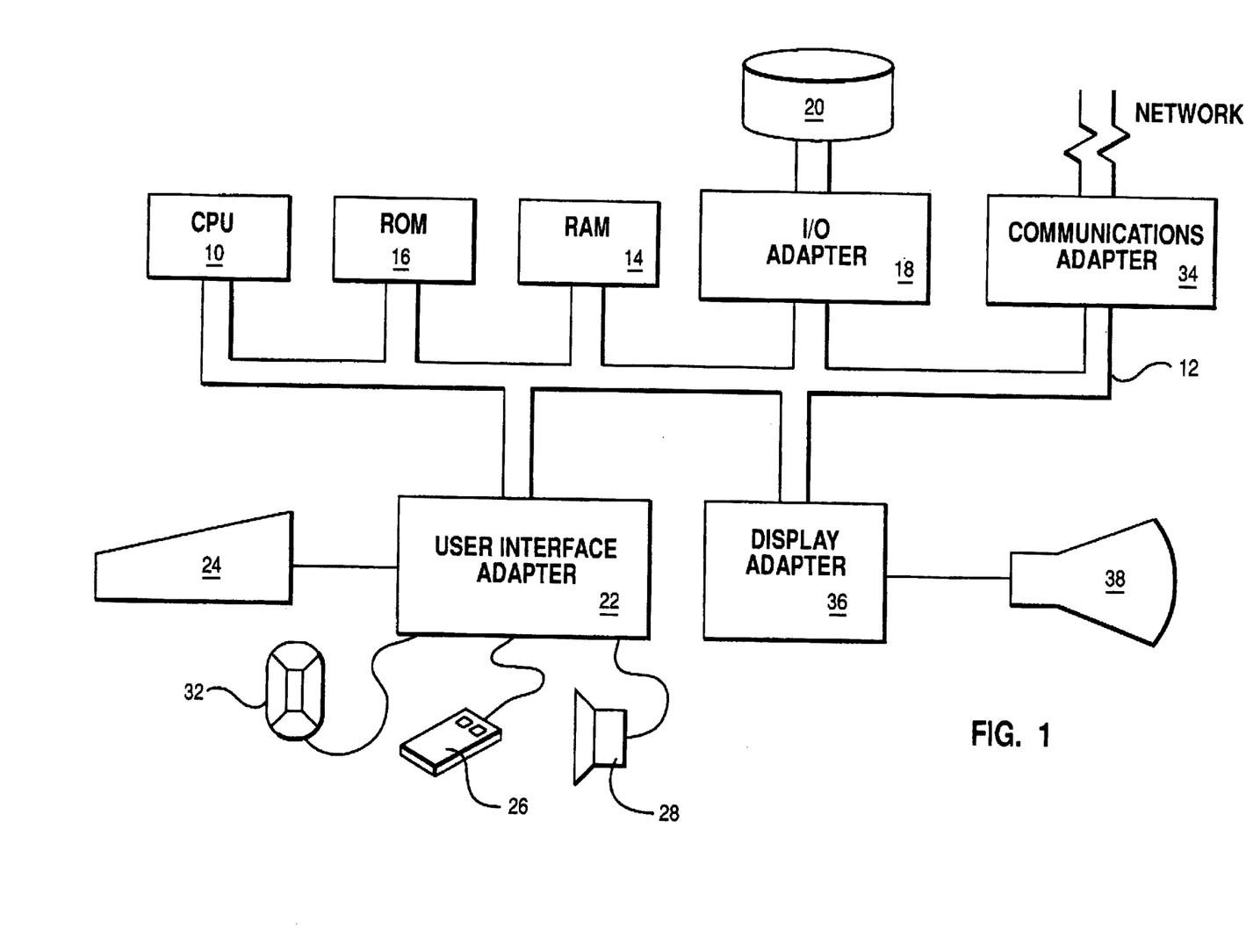
FIG. 1 is a schematic representation of a typical data processing system with which the present invention can be utilized.

Referring to FIG. 1, a typical data processing system is shown which may be used in conjunction with the present invention. A central processing unit (CPU), such as one of the Intel X86 processors or an IBM reduced instruction set computing (RISC) processors, is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, track ball 32 or mouse 26 and receiving output from the system via speaker 28 and display 38. Additionally, the operating system such as DOS, AIX or the OS/2 system (AIX and OS/2 are Trademarks of IBM Corporation) is used to coordinate the functions of the various components shown in FIG. 1. The computer system shown in FIG. 1 is an example of the type of systems that are capable of utilizing the present invention and can be used as the host or remote system.

Figure 2:
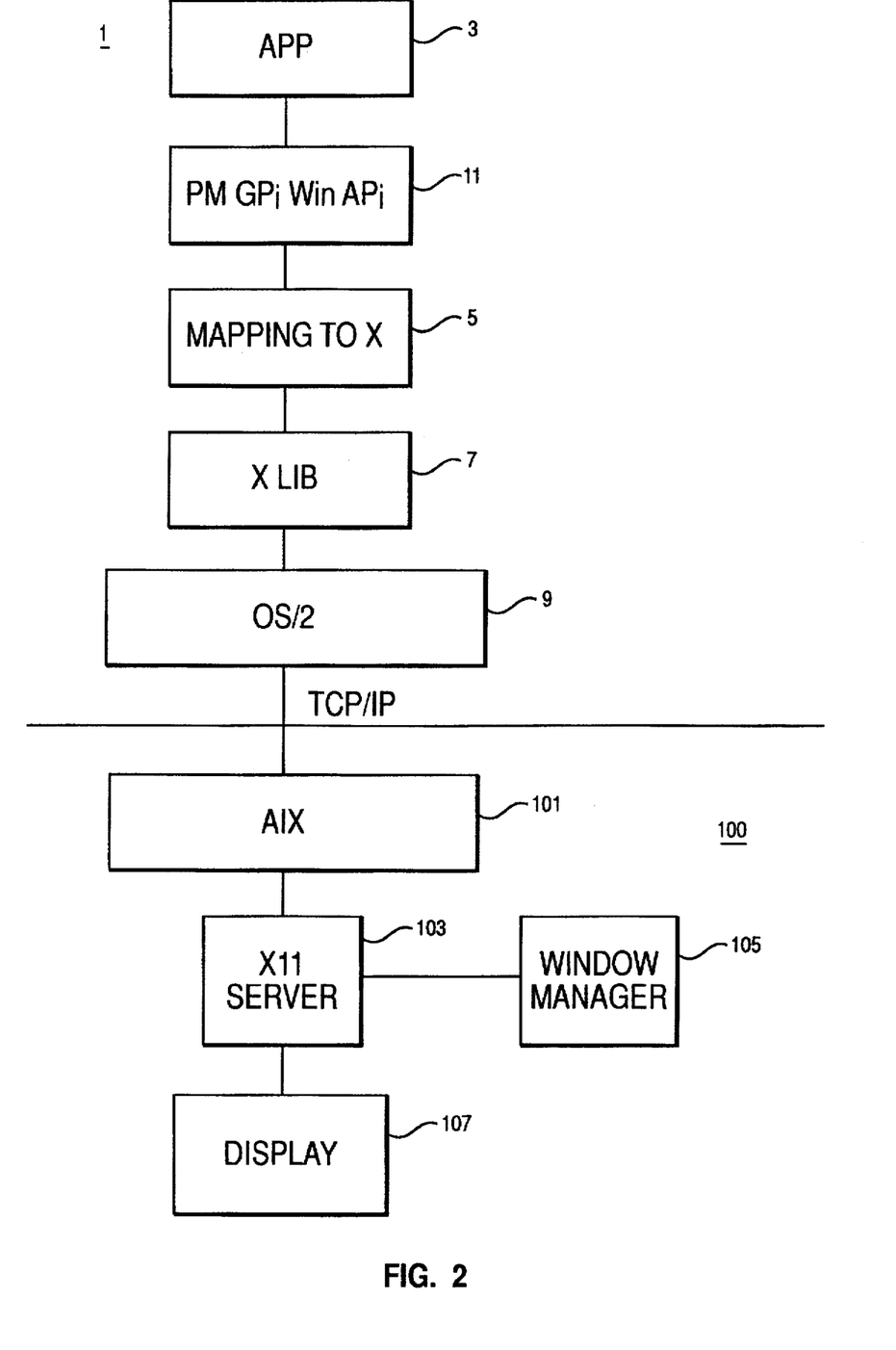
FIG. 2 is a block diagram showing the specific components of a system using the present invention and their relationship with one another.

FIG. 2 is a block diagram showing the various components of an interconnected system utilizing the present invention. A client system is generally noted by reference numeral 1. A client program application 3 is shown, which is a program written specifically for a particular operating system. In this case the client application, is written for the OS/2 operating system. Further, the Presentation Manager 11 is provided which is a programming interface used in conjunction with the OS/2 system. The purpose of PM is to provide a consistent application program interface for application written to OS/2. Specifically, PM provides Gpi and Win API support for the OS/2 applications. That is, PM provides all of the graphics support (Gpi) and window management (WIN API) for the program applications.

In order for the present invention to function, the calls from the PM 11 must be mapped into a form that is recognizable by the operating system running on the interconnected system. For example, the X11 graphical user interface is commonly used in conjunction with systems based on the UNIX operating system (UNIX is a trademark of Unix Systems Laboratories, Inc.), such as the AIX system. Thus, a mapping mechanism 5 is provided which will transform the application calls into a form that is recognizable by the interconnected operating system. This mapping function will be described in more detail in conjunction with FIGS. 5A through 5C, described below.

Generally, window systems (i.e. GUI) are tied to a specific operating system, e.g. PM and OS/2. Therefore, the term operating system as used herein will include the windowing system. It should be noted that the X Windows System is designed to operate across multiple operating system platforms. As described herein, the operating system on which X Windows is running will be considered as including the X Window System. The X Windows interface includes a library of function calls, known as the X library. This library includes commands that will control various display functions, such as input/output control of the display, keyboard, mouse, and the like. This library is essentially a collection of routines that can be used to create an X client program application. Thus, due to the mapping of the PM calls into X lib calls, the OS/2 application 3 essentially becomes an X client application. Operating system 9 is shown as the OS/2 system from IBM, Corp. and provides all of the low level control and data management functions required to implement application programs on specific hardware platforms, such as the PS/2 computer system, commercially available from IBM Corporation (PS/2 is a trademark of IBM Corp.). The operating system 9 then communicates with a remote operating system 101 (e.g. AIX) by way of a communications protocol, such as TCP/IP, or the like. In this manner the two different, incompatible operating systems, e.g. OS/2 and AIX can communicate with one another.

The X server component 103 is running on the AIX system and provides screen management facilities for display 107. More particularly, the X server is a graphics driver that controls the system. It handles requests from an X client application to created windows, draw lines, circles, text, and the like on the computer system display screen. Further, the X server will handle keyboard and mouse input from the computer system and relays this information back to the X client. A window manager 105 is also part of the X Windows interface and is used to allocate screen resources between various program applications, am well as, operating system functions that require information to be displayed. The window manager is a special X client that is run (one for each X server) in order to supervise the control of windows created on the display. The window manager creates the "look and feel" of the user interface. Further, the window manager is responsible for placing any border around the window, such as a title bar, control buttons to maximize or minimize the window, scroll buttons, system menu, or the like. The window manager also handles user input requiring movement or resizing of the window. In a preferred embodiment of the present invention, the Motif window manager from the Open Software Foundation (OSF) is contemplated for use as window manager 105. It should be noted that those of skill in this art will be familiar with the operation of the X Window System components. Therefore, the function of these components will not be further discussed.

Figure 3:
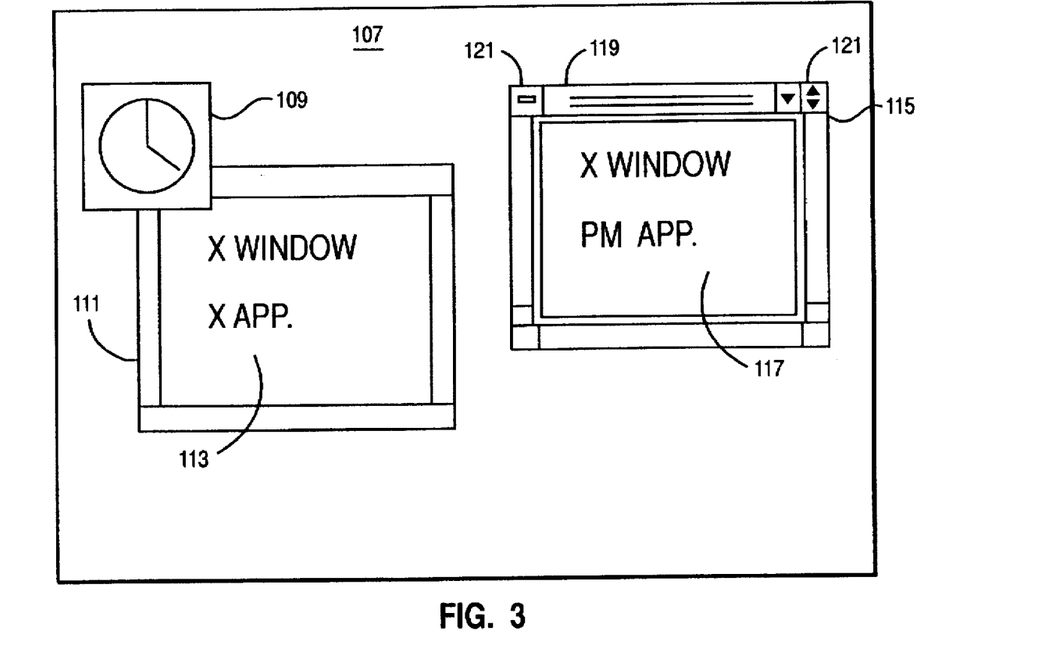
FIG. 3 is a display screen of a computer system illustrating another embodiment of the present invention wherein a remote application is running in the same window with the GUI of a system using a different operating system.

FIG. 3 is a screen on display 107 showing a typical X Windows display workplace wherein various AIX system program applications are running. For example a clock program 109 is shown along with an AIX application running in an X Window 113. The AIX application may be a word processing/desktop publishing application, such as Interleaf, AIX Interface Composer, or the like. Of course, many other program applications are capable of being run in window 113. A graphical user interface 111 is shown around the circumference of window 113. This is part of the X GUI and includes I/O features such as, software buttons, a scroll bar, pull down menus, a title bar 119, icons 121, and the like. Another window 117 is shown on display 107 which is an OS/2 system program application, such as Lotus 1-2-3, Excel, Clock, or the like running therein. Additionally, an X system GUI border 115 is present around the periphery of window 117. GUI 115 includes all of the I/O components normally found in an X border, which includes the scroll bar, icons, and the like, previously mentioned. In this manner, a user is capable of running a program application written for a first specific operating system (e.g. OS/2) on a platform having a second different operating system (e.g. AIX) such that the program application written for the first operating system responds to the user inputs to GUI associated with the second operating system. Further, the program application will provide output to the user in accordance with the GUI from the second operating system. For example, the program application may provide different titles to the window manager 105 for display on the title bar, and the scroll bar on the GUI border will change as the user scrolls through a document in a word processing application. Thus, the program application must provide output to the GUI in order for it to display the proper position of the scroll bar. It can be seen that not only does the present invention provide a system that allows a user to run program applications written for a different operating system, but also allows the user to interact with the application through a graphical user interface, based on the operating system resident on their system. Thus, a user can run applications written for different systems, and still be able to interact with these new applications through a familiar graphical user interface.

Figure 4:
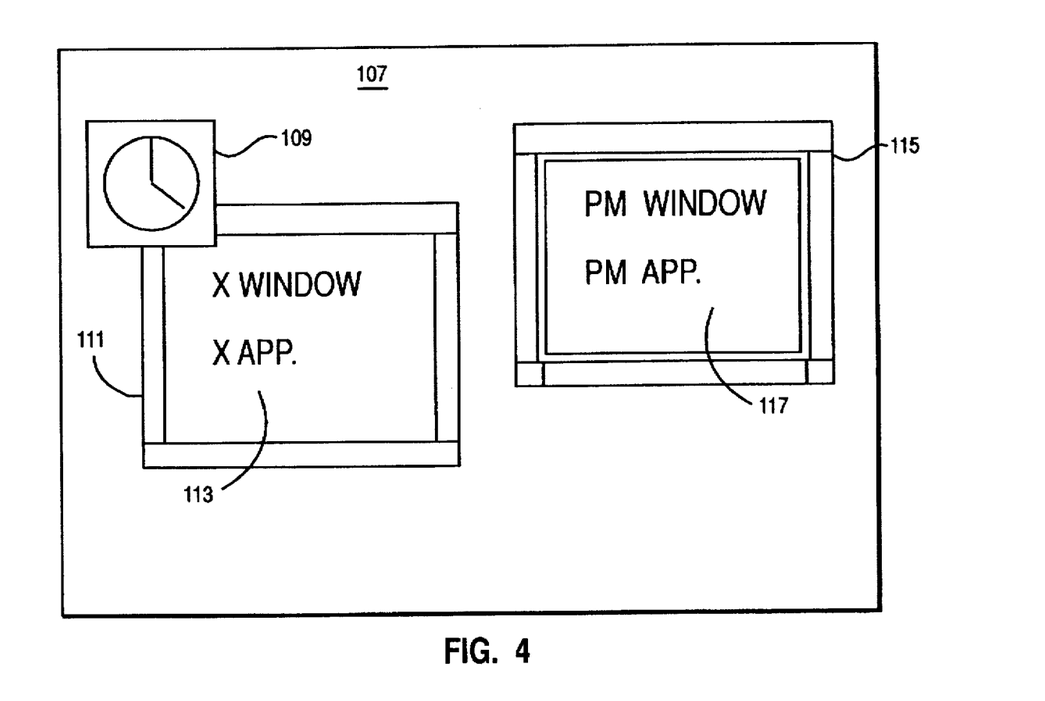
FIG. 4 is a display screen of a computer system illustrating a first embodiment of the present invention wherein a remote application and its GUI are running on a system with a different operating system.

FIG. 4 is a screen of display 107 illustrating another embodiment of the present invention. More particularly, the same AIX applications 109, 111, 113 are shown running on the display, along with a distributed PM application 117 running in a window having DPM border 115. In this case, the DPM GUI is displayed on top of the AIX border, such that the user sees only the DPM GUI. Additionally, it is possible to "shadow" the AIX border with the DPM border such that both are visible. In most cases both sets of functions will work and the user can use the GUI which is most familiar.

Figure 5A:
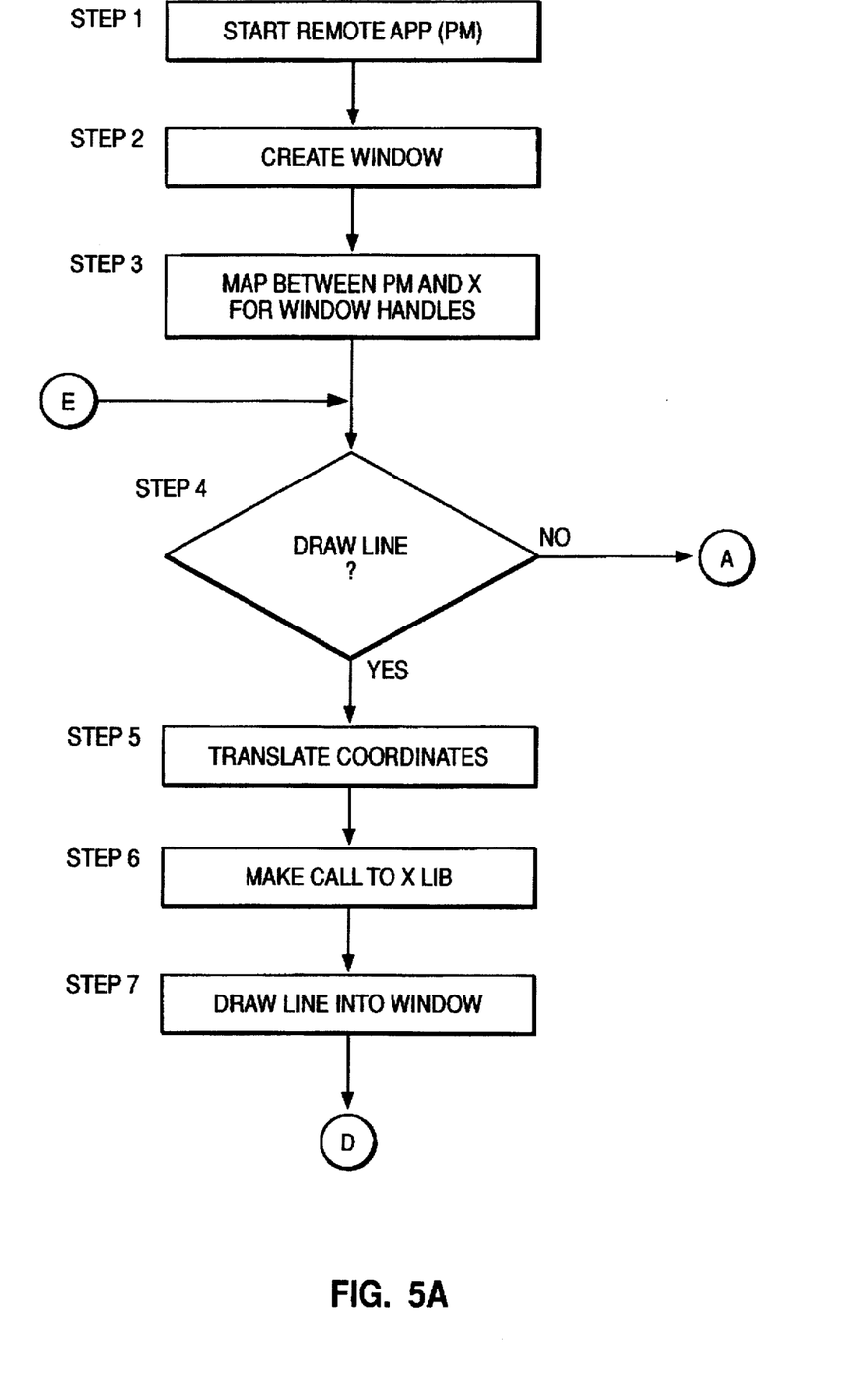
Figure 5B:
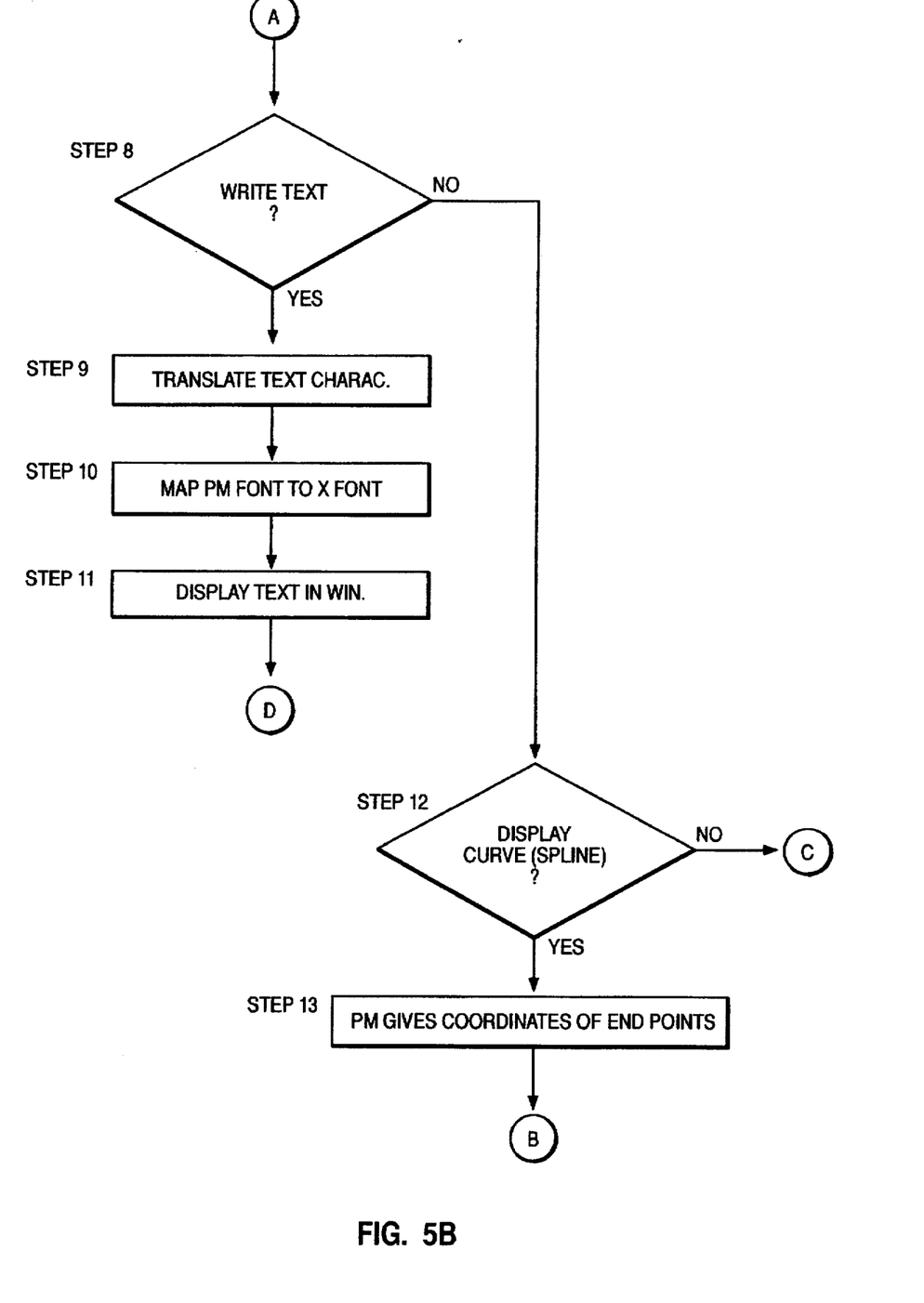
Figure 5C:
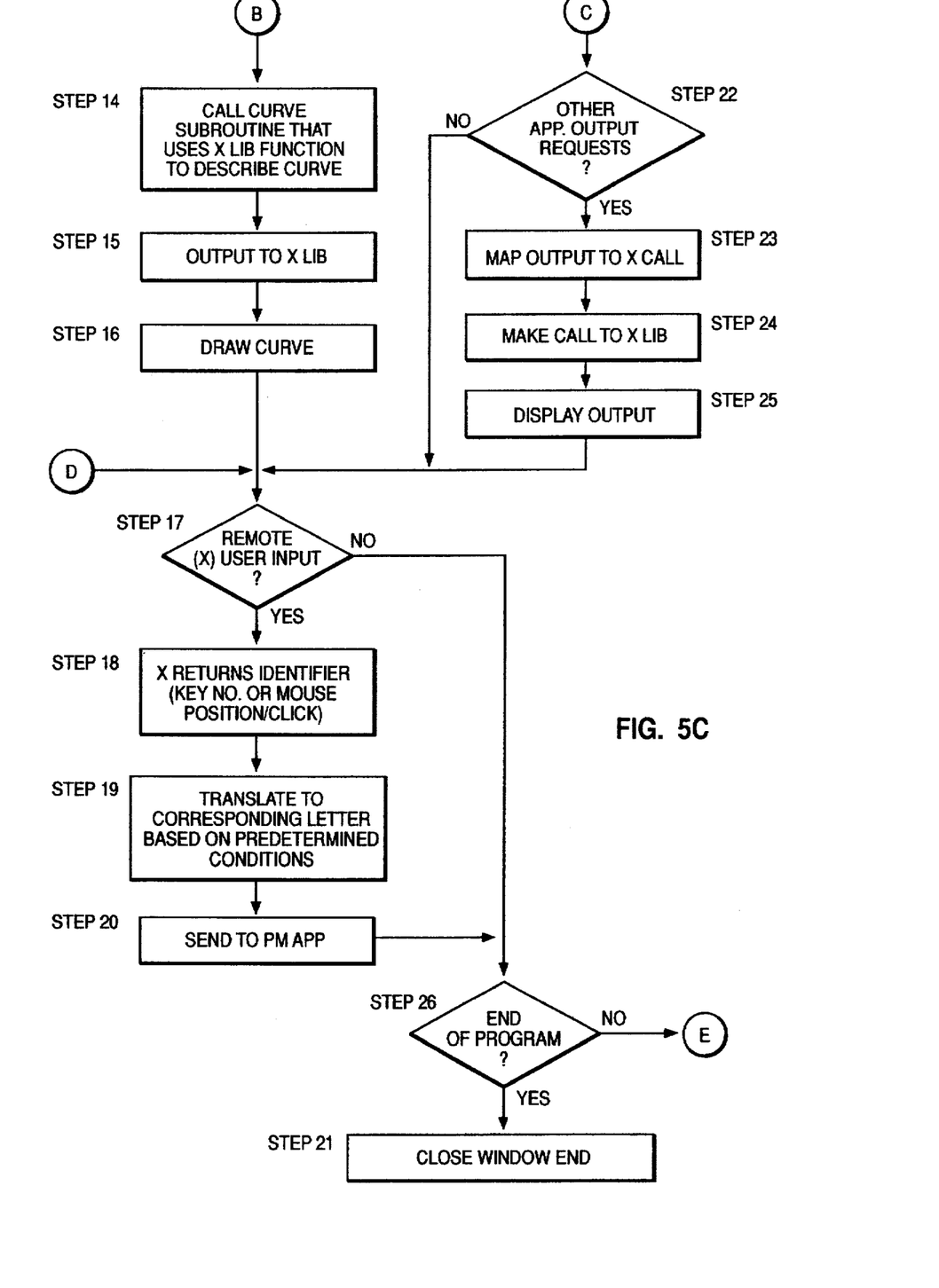

Referring to the flow charts of FIGS. 5A–5C, the operation of the present invention will now be described. It should be noted that FIGS. 5A–5C are representative of the operations that the present invention will perform in order to display a client application in a window of a host system. There are innumerable combinations of PM outputs that must be mapped to X lib calls. Thus, FIGS. 5A–5C show the basic functions of line drawing, curve drawing and text mapping. Those skilled in the art will understand how to apply these basic mapping operations to other functions output from the client application.

At step 1 the remote, or client application is initiated. One way is for the host, or server system user to input a startup.cmd and syslogin.cmd commands. This method will resemble remote startup using the RSH daemon on TCP/IP. For example, the AIX user will issue the command: rsh $NODE "start/dpmx=$DISPLAY my$_{13}$app". This command will cause the DPM daemon on remote node $NODE to prompt for a username and password. If the user name and password are valid the process is then started. At step 2, the application calls the WinInitialize command which checks for the distributed PM environment. If the DPM exists, a specific dynamic linked library is called that will build a table of subroutine addresses that will convert the calls to X library recognizable commands. This dynamic linked library (DLL) is provided in the PM interface application. Further, the calls from the application to the WIN and Gpi APIs in the PM interface are captured and redirected to the X library.

There are two types of window GUI's that can be used, as illustrated by FIGS. 3 and 4. FIG. 3 shows a system where there is not subclassing. This means that DPM will make no change to the default setting and the local window manager will be in control. This is the preferred embodiment and will include an X Window System having a GUI border that includes the title bar, scroll bar, software buttons, window sizing icons, and the like associated with a standard X GUI. A subclassed GUI means that the DPM GUI will be displayed either in conjunction with the X GUI or written on top of the X GUI such that only the DPM border is visible.

At step 3, the PM to X mapping layer 5 is used to translate the PM calls to X recognizable commands. A translate table is used to accomplish this conversion. Several problems had to be overcome in order to make this conversion. For example, the X window manager normally, initializes a window and then instructs the X client application that it has permission to write to the window. In contrast, the PM interface is used to opening a window and then immediately drawing to it. The PM method contemplates local, not networked systems. Thus, a conversion had to be made that would cause the PM interface to wait for some period of time before drawing to the X window. Further, a mapping relationship was created between the PM and X systems so that the X Window handles could be recognized and manipulated by the application 3 running on the remote system. The window manager will also recognize input from the DPM (via the X lib and X server) that will allow the titles on the GUI title bar to be changed. For example, if the X GUI title bar includes File, Edit, Help and Options, but the DPM program application also includes the title of Tools, then the DPM command can be translated and sent to the X window manager in order to make the title bar consistent with the program application running on OS/2.

Subsequent to step 3, the window has been created on the display 107 and it is then determined if the distributed PM application needs to draw lines (step 4). If so, the process continues to step 5 where the line coordinates are translated by the PM to X mapping means 5. It should be noted that line drawing is a fairly straight forward process, i.e. beginning and ending points are identified and and the intermediate pixels must be painted. In the X system, the initial pixel 0,0 is at the upper right portion of the screen and with PM it is at the lower right corner. Therefore, the y coordinates of the pixels must be translated. Once the translation is complete, the call is made (step 6) from the PM interface 11 to the X lib 7, which then outputs the equivalent X commands that will cause the line to be drawn. The line is then drawn into the window at step 7, and the operation jumps to step 17.

If it is determined that there is no line to be drawn at step 4, the operation proceeds to step 8 which determines if text is to be written into the window. If so, the DPM text characters are translated by the mapping means 5 and input to X lib 7 (step 9). Both PM and X use ASCII characters so this translation is relatively simple. However, these two systems do not necessarily use interchangeable fonts. Therefore, at step 10, the mapping means compares the PM fonts to the closest predetermined X fonts and outputs the command for these X fonts to the X lib. At step 11, the translated text is presented in the displayed in window 117 of FIG. 3. Subsequent to step 11 the method proceeds to step 17. If, at step 8 there is no text to be drawn, then the method proceeds to step 12 which determines if a curve, such as a spline, is to be displayed. If so, the PM interface outputs the beginning and ending points of the curve to the mapping means (step 13). In many cases, the X lib will not include function that corresponds to the function desired by the program application. Curves are one example of this type of function. Therefore, it was determined that support needed to be provided for a spline, which is a type of curve. In this case, the PM interface provides the coordinates for the endpoints to the mapping means. Further, the PM interface will indicate that a spline is to be drawn. Since, there is no equivalent function in the X lib, the mapping means then provides this new functionality by calling a subroutine (step 14) which determines which pixels intermediate the endpoints must be painted in order to create the spline. This subroutine effectively uses the existing X lib functions to describe the shape of the curve to be displayed. Once these pixels are determined, calls are made to a standard line draw routine in the X lib 7 for these pixels. The X lib then outputs commands which will cause the appropriate pixels to be painted. It can be seen that a virtually unlimited amount of new function may have to be supported in the mapping means, in order to support the function that is continuously being added to new applications being written. At step 15, the output from the X lib, that represents the curve is provided to the X server so the curve can be drawn in the window (step 16).

If at step 12 it was determined that no curves were to be displayed the operation skips to step 22 which determines if there are any other application output requests to be processed. If so, step 23 maps the output from PM into an X call. Step 24 then makes the call to the X lib and the display is output on the window at step 25. If there are no other application output requests, then the process moves directly from step 22 to step 17.

At step 17 it is determined if the host system user (AIX) will interact with the remote application (OS/2) by entering input. If not, the process continues to step 26. If the application does allow for user interaction, at step 18, an identifier is returned to the X server 103. This identifier will be in the form of a number that corresponds to keystrokes, or mouse position/click information. At step 19, the mapping means 5 will translate the number corresponding to the X system input into a letter that is recognizable by the DPM system. A translate table is used to make this conversion which takes into account certain predetermined conditions. For example, the X system allows for one finger keyboard operation wherein a user can press shift and subsequently press, e.g. "H", and the result will be identical to pressing shift and "H" simultaneously. It can be seen that all of the various combinations of keyboard input must be taken into account when translating user input. Once the translation is completed by the mapping means 5, the corresponding PM commands are sent to the PM interface 11 and provided to the application 3 as input (step 20). Subsequent to step 20, the method proceeds to step 26 which determines if the application program has ended. If so, the window is closed at step 21 and the process ends. However, if the program has not ended, then the method returns to step 4, and the process (subsequent to the creation of the window) is repeated.

The main function of the mapping means 5 is to redirect calls to the PM interface (specifically, to the PM WIN and Gpi APIs) to the X lib. As described above, some of the translation is fairly straightforward. If an X lib call exists that corresponds to a PM call, then some simple parameter shuffling may be all that is required. However, as noted above, for complex graphical functions the mapping means will have to break down the function and emulate it with multiple calls to the X lib (e.g. spline subroutine). Other PM calls require the establishment of data structures to hold local context or provide a mapping from a PM structure to an X structure, as in the case of a PM window handle being mapped to an X window handle/display combination).

It should be understood that the above description of various translations are provided as examples and should not be considered as all of the types of translations that must be performed by the mapping means. The present invention allows graphical or windowed program applications run on a first system to be displayed and interacted with through a GUI running on a second different operating system.

As noted above, there are many types of client application functions that must be mapped to the server system. These functions include include font support, window management, cursor support (e.g. mouse pointer vs. text cursor), line drawing, curve drawing, text mapping, bitmap conversions, and the like. It has been shown that some of these functions are relatively simple (e.g. line drawing and text mapping) while others are extremely complicated (e.g. curve drawing). As a representative example of how one of the more complex functions can be mapped between the client application and the server window system, the following description is provided.

BITMAP FUNCTION MAPPING

The Bitmap component of DPM is concerned with all functionality related to displaying, modifying, and querying bitmaps. Only bitmaps that have been created explicitly (i.e. that have a specific HBITMAP handle) are ever eligible to reside on the server. Since bitmaps created in other ways either cannot be monitored or are transient, there is little performance lost in sending these to the server each time. The server has a limited capability for storing bitmaps (pixmaps). If the server cannot store a bitmap, then previous bitmaps are removed in a least-recently-used order. Locally, these bitmaps are marked to indicate this fact.

API DETAILS

API NAME DESCRIPTION OF CHANGES

GpiBitBlt

This function moves bit arrays between two presentation spaces, both of which may be the same. Alternatively, only one presentation space can be provided. In this case, the blitting operation will involve only the manipulation of destination bit data and possibly pattern data.

The source and destination presentation spaces may or may not be associated with a remote window. The action that GpiBitBlt( ) takes depends on this. The following description summarizes the four scenarios possible.

(1) If both source and destination presentation spaces are local, then blitting takes place on the local PM machine in the standard way.

(2) If the destination presentation space is a remote window and the source presentation space is associated with a bitmap that is server-potential and is current (up-to-date on the server), then blitting is handled by the server. No transportation of the bitmap to the server need take place. If the resident bitmap is not current, then the bitmap is updated to the server again, marked as current, and then copied (at the server) to the destination window.

(3) If the destination presentation space is a remote window and no server-potential bitmap (or no bitmap at all) has been selected into the source presentation space, then blitting is performed by copying the bitmap directly to the remote window. No storage of the bitmap is performed on the server.

(4) If both the source and destination presentation spaces are remote windows, then blitting takes place on the server directly.

Background patterning takes place when certain raster operations are specified. This is taken care of on the server end by setting up a "stipple" of the appropriate background pattern into the graphic context used during the blitting operation. If the pattern is one of the standard PM patterns, then a stipple matching the pattern is created on the server the first time required, and left permanently on the server. It affects future drawing by being selected into a GC used in a drawing command.

GpiWCBitBlt This function operates just as GpiBitBlt( ) does with these differences;

- The source is always a bitmap, and not a presentation space. This means that the source always behaves like a memory presentation space with a bitmap associated with it.
- The destination presentation space rectangle is given in world coordinates rather than device coordinates. This means that the current transformation matrix applies.
- This call may be used with retained drawing and metafiles, as well as immediate drawing.
- Aside from these differences, this function follows the same rules as GpiBitBlt( ).

GpiDrawBits

This function is similar to GpiWCBitBlt( ) and calls it to perform its core function. The following comprise the differences between the two:

- Instead of a source bitmap, the caller specifies image data by supplying pointers
- directly to bitmap information and image data.
- In all other respects, this function acts the same as GpiWCBitBlt( ).

GpiCreateBitmap

This function creates a bitmap that is logically associated with a particular device. The device is the one associated with the presentation space passed in the call. If this device is a remote display, the bitmap is marked as server-potential, but not downloaded until its first use.

GpiDeleteBitmap

This function deletes a bitmap created with one of the bitmap creation functions. This function will cause the bitmap to be removed from the server immediately, if it is server-potential and has been downloaded at least once already.

If the bitmap is a server-permanent bitmap, any call to delete the bitmap executes normally as far as PM structures are concerned. But no deletion of the associated server pixmap is done.

GpiLoadBitmap

This function acts just like GpiCreateBitmap( ), with the following differences;

- Instead of obtaining the bitmap image from user supplied data, the bitmap image is loaded from a resource.
- In all other aspects, this function is the same as GpiCreateBitmap( ).
- This function should work unmodified in a remote environment, once it is sanitized.

GpiQueryBitmapBits

This function retrieves bitmap data from a presentation space which must be associated with a bitmap.

Since even server-potential bitmaps are stored locally, this function operates correctly without modification in a remote environment.

GpiQueryBitmapDimension

This function returns bitmap dimension data that has been previously set with the GpiSetBitmapDimension( ) function. Bitmap dimension data is not related to the actual size of the bitmap, and in fact, is not utilized by the system at all.

This function will work without modification in a remote environment.

GpiQueryBitmapHandle

This function returns the bitmap handle that is associated with specific ID that has been set with the GpiSetBitmapId( ) function.

It will work without modification in a remote environment.

GpiQueryBitmapParameters

This function returns bitmap size data from a bitmap handle.

It will work without modification in a remote environment.

GpiQueryDeviceBitmapFormats

This function returns information about supported bitmap formats for the device associated with the passed presentation space.

This function must be hooked so that only device bitmap formats that are supported by the remote display are returned.

GpiSetBitmap

This function associates a bitmap with a presentation space. The presentation space must be associated with a memory device context.

This function must be hooked so the bitmap handle is recorded by DPMX.

GpiSetBitmapBits

This function modifies a bitmap associated with a presentation space.

It will work without modification in a remote environment.

GpiSetBitmapDimension

This function sets bitmap dimension data (not related to the actual size of a bitmap, and not utilized by the system at all) that may later be queried with the GpiQueryBitmapDimension( ) function.

It will work without modification in a remote environment.

GpiSetBitmapId

This function associates an ID value with a bitmap. Once such an ID has been set, the bitmap may be queried by this ID.

This function should work without modification in a remote environment.

WinDrawBitmap

This function is similar to GpiWCBitBlt( ) and uses it to perform its core function. The following comprise the differences between these two functions:

- Destination rectangle is specified in device coordinates, rather than world coordinates.
- Foreground color, background color, color inversion, and simple half-toning, but no other special operation, may be performed by specifying arguments directly to this call.
- In all other aspects, this function behaves the same as GpiWCBitBlt( ).

WinGetSysBitmap

This function is similar to GpiLoadBitmap( ), with the following differences:

- The system bitmap to be loaded is specified by a system wide ID.
- The source of the bitmap is specified by naming the desktop window which it will be drawn on. This allows multiple versions of a bitmap that are each customized for a particular type of display.

The bitmap is marked as server-permanent; It will remain on the server even after the application that requested it terminates. The downloading only occurs the first time the bitmap is requested.

NEW FUNCTIONS CREATED

NEW FUNCTION NAME DESCRIPTION

BitmapCreate( ) Called by XGpiCreateBitmap( )

This function creates a new "virtual" server pixmap that corresponds to a bitmap that may POTENTIALLY be displayed. Once created, changes to the associated bitmap are "watched" so that the currency of the server version can be tested. A pixmap is not physically transported to the server just because it is created. Only when the bitmap is drawn onto a remote window for the first time will it be transported. If transported, the bitmap is copied unaltered; i.e. raster-op requests affecting the appearance of the bitmap are not utilized in the copy from the host to the server. This occurs only when the bitmap is copied from the server-resident pixmap to a server-resident window, except in two special cases discussed elsewhere.

This function will be called by all PM hooked functions that introduce a new bitmap to the system if there is a possibility that the bitmap may be displayed on a remote window. It will ensure that the necessary data structures are created for tracking that bitmap.

BitmapInvalid( )

Called by XGpiSetBitmapBits( ), XGpiDeleteBitmap( ), XGpiSetBitmap( ), XGpiBitBlt( ), XGpiWCBitBlt( )

This operation causes the server-resident version of the bitmap to be considered out of date in relation to the PM version, if it exists. Any further action requiring the presence of the bitmap on the server will invoke BitmapTransport( ) to transport or re-transport the bitmap.

This function must be called whenever a hooked PM function has determined that a bitmap may have changed. This will happen whenever any drawing primitive affects a remote presentation space that has a server-potential bitmap selected into it.

BitmapTransport( )

Called by XGpiBitBlt( ), XGpiWCBitBlt( )

This operation will transport the bitmap to the server, performing all color and coordinate transformations along the way. The bitmap is then marked as current.

Color transformation involves creating a local conversion map. Each PM bitmap color (there will be either 2, 16, or 256) will be mapped to the an X pixel value using the RGBtoXPixel( ) function. The bitmap will always be promoted (or demoted) to the depth most natural for the server. If the original bitmap has a depth greater than the maximum supportable depth on the server, color information will naturally be lost.

BitmapFind( )

Called by XGpiWCBitBlt( ), XGpiBitBlt( ), XGpiSetBitmap( ), WinDrawBitmap( ), GpiDeleteBitmap( ), GpiCreateBitmap( )

This function will return the pointer to the local bitmap tracking structure associated with it. The function BitmapCreate( ) must have been called for the bitmap beforehand, or NULL will be returned.

BitmapDraw( )

Called by XGpiBitBlt( ), XGpiWCBitBlt( ), XWinDrawBitmap( ), XGpiDrawBits( )

This function causes a bitmap or a portion of a bitmap to be transferred to a remote window. This may involve the update (through the BitmapTransport( ) function) of the bitmap onto the server followed by a server to server copy. Alternatively, if the bitmap is not of a type that uses a server-resident copy, it is drawn directly to the window.

BitmapDestroy( )

Called by XGpiDeleteBitmap( ) This function unassociates a bitmap with any tracking data. If a server-resident version of the bitmap exists, current or not, it will be removed from the server.

BitmapProcess( )

Called by XGpiWCBitBlt( ), XGpiBitBlt( ), XGpiSetBitmap( ), WinDrawBitmap( ), GpiDeleteBitmap( ), GpiCreateBitmap( )

This function performs special pre-processing on a bitmap, if necessary, before sending it to the server. Pre-processing always involves translating the original PM bitmap to another PM bitmap, which then replaces the original bitmap in further processing. Pre-processing conversion will be applied if either expansion/contraction is required. In both cases, the appropriate conversions, since they cannot be applied at the server, are applied locally to create the replacement bitmap.

OTHER FUNCTIONS AFFECTED

FUNCTION NAME DESCRIPTION

GpiPush( ), GpiPop( ), GpiQueryAttrs( ), GpiSetAttrs( )

Two-color bitmaps can utilize the current foreground and background colors as their color map. These operations affect the current foreground and background color.

RGBtoXPixel( )

This DPMX function is used to translate a bitmap RGB map to X pixel values before transporting the bitmap to the server.

iAddXPS( )

The bitmap reference variable (XPS.pixmap) which is loaded when a bitmap is "set" into a presentation space, is initialized to null here.

DATA STRUCTURES

The fundamental bitmap structure used to track the state of a bitmap and it's server version, is SERVERBITMAP. One of these is created in a blocked linked list for each bitmap that may be potentially displayed on a remote window. The blocked link list consists of bitmap structure entries that are in a standard linked list format, but are allocated in multiple count groups.

STRUCTURES THAT CHANGED
typedef struct __XPS
{

| | | |
|---|---|---|
| HPS | hps; | /* real presentation space handle on PM side */ |
| DPMXWindow | *pwin; | /* window this hps is in, if any */ |
| long | lCoordSys; | /* coordinate system of Presentation Space */ |
| GC | gcLine; | /* gc used for line attributes on X side */ |
| GC | gcChar; | /* gc used for character attributes on X side */ |
| GC | gcMarker; | /* gc used for marker attributes on X side */ |
| GC | gcPattern; | /* gc used for pattern attributes on X side */ |
| cr | gcImage; | /* gc used for image attributes on X side */ |

-continued

```
    short       x;           /* current x coordinate in the
    hps */
    short       y;           /* current y coordinate in the
    hps */
    LONG        lGeomWidth;  /* line width during
    GpiStrokePath */
    LONG        lXPSFlags;   /* DPMX flags to keep track of
    extra stuff */
    /* Attribute mode and saved attributes we have to keep
    track of */
    BOOL        bAttrSave;   /* flag to save attributes in
    LIFO stack */
    int         iPMATTRCnt;  /* count of attributes in
    attribute stack */
    PMATTR      *pPMATTR;    /* pointer to top of LIFO
    attribute stack */
    /* Character values we have to keep track of */
    LONG        lcidChar;    /* current lcid for font in */
    use */
    int         iCharSets;   /* count of number of char
    sets */
    SETMAP      *pCharMap;   /* pointer to top of char set
    map array */
    SHORT       fsSelection; /*
    bold/italic/strikeout/underline flags */
    USHORT      usPrecision; /* 1 = default, 2 = better, 3
    = best */
    SIZEF       sizfxChar;   /* values for w/h of character
    box */
    POINTL      ptlAngle;    /* point used to determine
    text angle */
    POINTL      ptlShear;    /* defines how pushed over
    chars are */
    USHORT      usDirection; /* l->r, u->d, etc. */
    USHORT      usTextAlign; /* undocumented */
    FIXED       fxExtra;     /* extra spacing increment for
    all chars */
    FIXED       fxBreakExtra;/* extra spacing increment for
    break char */
    /* Marker values we have to keep track of */
    int         iMarkerSets; /* count of number of marker
    sets */
    SETMAP      *pMarkerMap; /* pointer to top of marker
    set map array */
    USHORT      usMarker;    /* current marker symbol in
    marker set */
    SIZEF       sizfxMarker; /* values for w/h of marker
    box */
    /* Marker values we have to keep track of */
    int         iPatSets;    /* count of number of pattern
    sets */
    SETMAP      *pPatMap;    /* pointer to top of pattern
    set map array */
    int         iPositionCnt;/* count of number of saved
    current positions */
    POINTL      *pCurPos;    /* pointer to top of current
    position array */
    /* Default values we have to keep track of */
    LINEBUNDLE          lbndDefault;
    CHARBUNDLE          cbndDefault;
    MARKERBUNDLE        mbndDefault;
    AREABUNDLE          abndDefault;
    IMAGEBUNDLE         ibndDefault;
    BOOL ColorDecodeMode;    /* FALSE: Indexed off of
    current index; */
                             /* TRUE: Direct RGB triplets
    */
    Pixmap      pixmap;      /* current pixmap, or
    NULL if not set */
    #def NOT_YET
    char cClipRects; /* count of the number of clipping
    rectangles; */
    XRectangle *paxrClipRects;/* pointer to array of
    clipping rectangles */
    #endif
    } XPS;
NEW STRUCTURES
struct SERVERBITMAP
    {   HBITMAP     Local.;
        Pixmap      Server;
```

```
    UCHAR       Flags;
    };
    #define SERVERBITMAPFLAGcurrent    0x01  // Bitmap is up
    to date on server
    #define SERVERBITMAPFLAGpermanent  0x02  // Bitmap is to
    remain stored on
                                             // the server
    after termination
```

Although certain preferred embodiments have been shown and described, it should be understood that many changes and modifications can be made therein without departing from the scope of the appended claims.

What is claimed is:

1. A data processing system for displaying output of a program application executing on a first computer system, written for a first operating system on a second computer system having a second operating system; said second computer system connected to said first computer system, comprising:

means for allocating a portion of said second computer display screen for the output of said program application, and a graphical user interface on said second computer system, based on the second operating system in said second computer system;

means for enabling user commands to said graphical user interface on said second computer system to be processed by said program application on said first computer system; and means for displaying the output from said program application and said graphical user interface in said portion of said display screen on said second computer system.

2. A system according to claim 1 wherein said means for displaying comprises means for mapping commands from said program application on a first computer system to commands which can be interpreted by said second operating system on said first computer system.

3. A system according to claim 2 wherein said means for mapping comprises means for creating function in said second operating system on said second computer system to accommodate function present in said program application on said first computer system.

4. A system according to claim 3 wherein said enabling means comprises:

means for interpreting commands from said graphical user interface on said second computer system directed to said program application on said first computer system; and means for translating said commands into a form recognizable by said program application on said first computer system.

5. A system according to claim 4 wherein said means for creating function comprises:

means for comparing the program application function on said first computer system with function provided by said second operating system on said second computer system;

means for determining the function within said second operating system on said second computer system related to said program application function on said first computer system; and means for using the function in said second operating system on said second computer system to simulate the application function on said first computer system.

6. A method of displaying a program application, written for a first operating system and executing on a first computer system, comprising the steps of:

allocating a portion of a computer display screen, for providing a graphical user interface based on a second operating system on a second computer system;

enabling commands from said graphical user interface on said second computer system to be processed by said program application on said first computer system; and displaying output from said program application on said second computer system and said graphical user interface in said portion of said display screen on said second computer system.

7. A method according to claim 6 wherein said step of displaying comprises the step of mapping commands from said program application on said first computer system to commands which can be interpreted by said second operating system on said second computer system.

8. A method according to claim 7 wherein said step of mapping comprises creating function in said second operating system on said second computer system to accommodate function present in said program application on said first computer system.

9. A method according to claim 8 wherein said step of enabling comprises the steps of:

interpreting commands directed from second computer system to said program application on said first computer system; and translating said commands from said second computer system into a form recognizable by said program application on said first computer system.

10. A method according to claim 9 wherein said step of creating function comprises the steps of:

comparing the program application function on said first computer system with function provided by said second operating system on said second computer system;

determining the function within said second operating system on said second computer system related to said program application function on said first computer system; and using the function in said second operating system on said first computer system to simulate the program application function on said first computer system.

11. A method in a data processing system for displaying a remote application program in a window on a first computer system having a first graphical user interface from a first operating system, wherein said remote application program is in a second computer system having a second graphical user interface from a second operating system, said first computer system connected to said second computer system, comprising:

starting the execution of said remote application program in said second computer system having said second graphical user interface from said first computer system;

identifying said first computer system and a location for displaying said window by said second computer system;

converting user input commands of said second graphical user interface into associated user input commands of said first graphical user interface; and displaying said remote application program and the associated user input commands of said first graphical user interface in said window on said first computer system.

12. The method of claim 11 wherein the step of displaying said remote application program includes the step of mapping the remote application text of said second computer system into associated remote application text of said first computer system.

13. The method of claim 11 wherein the step of displaying includes the step of controlling the remote application program on said second computer system by said associated user input commands on said second computer system.

14. The method of claim 11 wherein said first operating system is Operating System/2 and said second operating system is AIX.

* * * * *